United States Patent [19]
Wyant

[11] Patent Number: 5,335,725
[45] Date of Patent: Aug. 9, 1994

[54] WELLBORE CEMENTING METHOD

[75] Inventor: Reece E. Wyant, Houston, Tex.

[73] Assignee: Shell Oil Company, Houston, Tex.

[21] Appl. No.: 96,797

[22] Filed: Jul. 23, 1993

[51] Int. Cl.$^5$ ............... E21B 19/22; E21B 33/138; E21B 33/14

[52] U.S. Cl. ................. 166/292; 166/383; 166/384

[58] Field of Search ............ 166/383, 293, 292, 384, 166/308

[56] References Cited

U.S. PATENT DOCUMENTS

| | | |
|---|---|---|
| 2,933,135 | 4/1960 | Johnson ............... 166/283 X |
| 3,180,748 | 4/1965 | Holmgren et al. . |
| 3,208,522 | 9/1965 | Roebuck et al. ............ 166/283 |
| 3,499,491 | 3/1970 | Wyant et al. . |
| 3,507,332 | 4/1970 | Venable, Jr. et al. . |
| 3,620,785 | 11/1971 | Root et al. . |
| 3,654,991 | 4/1972 | Harnsberger et al. ........... 166/283 |
| 3,860,070 | 1/1975 | Herce et al. ............... 166/292 |
| 4,673,035 | 6/1987 | Gipson . |
| 5,027,903 | 7/1991 | Gipson . |
| 5,058,679 | 10/1991 | Hale et al. . |
| 5,226,961 | 7/1993 | Nahm et al. . |

*Primary Examiner*—Stephen J. Novosad
*Attorney, Agent, or Firm*—Del S. Christensen

[57] ABSTRACT

A method for cementing a wellbore wherein a slurry comprising at least five percent by weight of particles having a particle size greater than about 0.04 inches is placed in the wellbore. The slurry has a density which exceeds the hydraulic fracture gradient of the formation but the slurry is not lost to fractures because the larger particles enable the solids in the slurry to bridge and prevent excessive slurry loss. The cement slurry of the present invention is preferably placed in the wellbore by a direct placement method such as a coil tubing placement to minimize the pressure placed on the formation by any particular cement slurry.

7 Claims, No Drawings

WELLBORE CEMENTING METHOD

FIELD OF THE INVENTION

The present invention relates to a method for cementing a wellbore within a formation with a cement having a hydraulic gradient that exceeds the fracture gradient of the formation.

BACKGROUND TO THE INVENTION

In oil-well primary cementing, it is generally required that the pressure resulting from the hydrostatic head of the column of cement slurry and other wellbore contents not exceed the fracture pressure of the formation. If this pressure exceeds the formation fracture pressure, a fracture may form. Cement slurry flowing into the fracture then decreases the amount of cement within the borehole, and an inadequate amount of cement may remain in the borehole to support the casing. Casings are therefore cemented into wellbores in formations having a low fracture gradient using low density cement slurries.

Low density cement slurries can be provided by creating a foam from the slurry, diluting the cementitious components with additional water, or including in the slurry a low density aggregate such as graphite or hollow spheres. These low density cement slurries generally result in set cements having relatively low compressive strengths, high porosity and low thermal conductivity.

It is therefore sometimes advantageous to use higher density cement slurries and avoid fracturing the formation by other means. For example, a wellbore can be cemented in stages. In each stage, a portion of the wellbore is cemented. The portion is small enough that the static head of even a high density cement and other wellbore fluids do not exceed the fracture pressure of the formation. Staged cementing is time consuming and can result in discontinuities in the set cement.

High density cement slurries are preferred for cementing wellbores for recovery of hydrocarbons by thermal recovery processes. In particular, heat injection wells in thermal conduction process are preferably cemented with cements that can withstand high temperatures for extended periods of time, and have high thermal conductivity. High alumina content cements meet these requirements, and have low porosity and high strength. But high alumina content cement slurries are generally very dense.

Cement slurries typically contain fluid loss additives to reduce the loss of water from the slurry into permeable formations. This fluid loss can result in the slurry becoming dehydrated and viscous. This is called "flash setting" and is typically avoided in well cementing art by the use of ample initial water in the slurry and fluid loss additives. Polymers are often used as fluid loss additives used in cement slurries. Such polymers function by creating an immobile gel in pores of the formation adjacent to the cement slurry. Fluid loss additives therefore do not prevent or control fracturing but only prevent the loss of water from the slurry prior to hydration.

It is therefore an object of the present invention to provide a method to cement a wellbore wherein the cement slurry density exceeds the fracture gradient of the formation in which the cement is to be placed.

SUMMARY OF THE INVENTION

This and other objects are accomplished by a method comprising the steps of:

placing into the wellbore a cement slurry comprising at least 5 percent by weight, based on the total solids in the slurry, of solids having a diameter greater than about 0.04 inches, at least about 5 percent by weight, based on the total solids in the slurry, of solids having a diameter between about 0.004 and 0.04 inches, and at least about 10 percent by weight, based on the total solids in the slurry, of solids having a diameter of less than about 0.004 inches, wherein the slurry density is such that the static head of the wellbore contents would result in a pressure on the formation that would exceed the formation fracture initiation pressure and allowing the slurry to hydrate.

A dense slurry can be placed within a wellbore using a cement slurry having this amount of relatively large solids because the large solids bridge over any initiating fracture.

A very dense and low water content cement slurry is preferably placed in a wellbore by a coiled tubing placement directly into the annulus between the formation and a casing. The coiled tubing is raised as the annulus is filled. A small loss of water from such a slurry can cause the slurry to thicken, and could make it difficult or impossible to force slurry up an annulus from the bottom of a string of tubulars according to typical primary cementing methods.

DETAILED DISCUSSION OF THE INVENTION

The present invention is not limited to any particular type of wellbore cement. The present invention could be applied to, for example, commercially available Portland type cements, high alumina cements, and blast furnace slag based cements. The bridging and thickening upon the loss of water occur regardless of the type of cement.

In a preferred embodiment of the present invention, the cement used is a high alumina cement. This cement, to obtain the maximum benefit of the high alumina formulation, is formulated with a relatively dense slurry. High alumina cements such as those disclosed in U.S. Pat. Nos. 3,620,785; 3,499,491; 3,180,748; and 3,507,332 are acceptable. High alumina cements are also available commercially from suppliers such as National Refractories, Inc. of Livermore, Calif. and A.P. Green, Inc, of Mexico, Mo. EZ CAST 3000 is a castable refractory from National Refractory that functions well as a high alumina cement in the practice of the present invention.

Blast furnace slag cements that are acceptable in the present invention include those disclosed in, for example, U.S. Pat. No. 5,058,679.

The solids having a diameter of about 0.04 inch or greater may be particles of cement, or inert aggregate such as sand or crushed rocks. A polymeric material having a high compressive strength would also be acceptable. A crushed material is preferred because of the irregular nature of the particles improve bonding with set cement, and enhances bridging. The maximum size of the particles is limited only by the ability of the slurry to suspend the solids and the mechanical equipment's dimensions and ability to pump the slurry of the present invention. More preferably, at least 10 percent by weight of the cement slurry is solids having particle sizes greater than about 0.04 inches because a slurry containing a greater amount of bridging particles will bridge a fracture more quickly than will a slurry containing fewer bridging particles.

Particles in a fluid system will bridge a fracture or crack which has a width approximately three times that of the particles. Thus No. 6 mesh size particles would bridge a fracture about 0.396 inches wide, or three times the minimum opening size the particles would pass through. A distribution of particle sizes smaller than the largest size is also needed to bridge the spaces between the larger particles and then successively down to the small cement particles, which normally have a maximum size of about 0.004 inches. Particles of about a 0.004 inch diameter, when bridged over the larger particles, will create a sufficiently high pressure drop for water carrier fluid that fluids will not be lost through the bridged fracture. To receive maximum benefit from particles that pass through a four mesh screen and are retained on a six mesh screen (0.132 to 0.187 inch diameter particles), some particles must be present that can be caught on a 16 mesh screen but pass through a ten mesh screen (0.0394 to 0.0661 inch diameter particles). It is most preferred that at least two percent by weight, based on the total solids in the slurry, of solids have a diameter between about 0.004 inches and about 0.008 inches, at least two percent by weight, based on the total solids in the slurry, of solids have a diameter between about 0.008 and 0.016 inches, and at least two percent by weight, based on the total solids in the slurry, of solids have a diameter between 0.016 and 0.04 inches, along with at least five percent of the solids larger than about 0.04 inches in diameter and at least about 10 percent of the solids smaller than about 0.004 inches.

For the purpose of determining the particle size of the solids of the present invention, the particle size is defined as the smallest wire screen clear opening through which the particles will pass. For example, a six mesh Tyler Sieve Series screen has an opening of about 0.132 inches and an eight mesh Tyler Sieve Series screen has an opening of about 0.0937 inches. Particles passing through the six mesh screen but not the eight mesh screen, or six to eight mesh particles, would have a particle size of between 0.0937 and 0.132 inches. Additionally, the particle sizes are determined in a dry state, i.e., prior to preparation of the slurry.

The solid particles may be of a cementitious material or may be inert. Solids having a high strength, such as crushed rocks where the rocks are high strength rocks such as quartz or rocks having a high level of quartz may significantly improve the strength of the set cement by functioning as reinforcing aggregates.

Cementitious particles are particularly preferred when the cement is a blast-furnace slag based cement. Crushed blast furnace slag of a relatively large particle size is relatively inexpensive and would eventually bond with the surrounding blast furnace slag cement.

When a high alumina cement slurry is used with coiled tube placement directly into the annulus, the water content of the cement slurry is preferably low. A water content of between about 7 and about 15 percent by weight based on the slurry solids is preferred. With a low water content, the slurry will rapidly become non-mobile upon the loss of relatively small amounts of water to the surrounding formation and a much greater height of the dense slurry can be placed in the annulus without fracturing the formation. Also, the low water content increases the concentration of the large size solids in the slurry and the large size solids bridge over the fracture entrance before sufficient total fluid enters the fracture to widen the fracture further.

The process of the present invention preferably includes placement of the cement slurry into the wellbore by a direct placement method. By a direct placement method it is meant a method such as a coiled tube placement wherein the cement is pumped through a tube wherein the tube passes through the annulus between the tubular being cemented into the wellbore and the wellbore and higher casings. Coiled tubing is typically a one to two and a half inch diameter tube that is transported to the wellhead on a roll. The tubing is then straightened as it is injected into the well through a packer apparatus such as the apparatus disclosed in U.S. Pat. No. 5,027,903. An acceptable apparatus to transport, unroll, straighten and inject the tubing is disclosed in U.S. Pat. No. 4,673,035. The tubing is injected to about the depth that the cement is to be placed within the wellbore. Then the cement slurry is pumped directly into the annulus through the tubing. The tubing can then be raised through the packer and rolled back into its original configuration as the cement level rises.

Direct placement of the cement slurry, as opposed to the typical circulation, helps minimize both the pressure the formation is exposed to, and the time during which the formation must be exposed to that pressure. The pressure is minimized by elimination of tile hydraulic pressure drop caused by forcing the slurry from the bottom the of interval to be cemented into the annulus. The time during which the formation is exposed to the high pressure can be minimized by direct placement because a slurry can be used that sets more quickly than could be used with the typical circulation method. A slurry containing less water could also be used with a direct placement method because of the elimination of the need to force the slurry up the annulus.

The cement slurry of the present invention can also be placed in the annulus through a coiled tubing apparatus in a continuous operation. Heavy slurries are often placed using a coiled tubing in stages, with each stage allowed to hydrate prior to placement of the next stage. Placement of the slurry of the present invention in stages is not necessary because initiating fractures become bridged with solids. The cement slurry can therefore be placed in a continuous operation. By a continuous operation, it is meant that the flow of cement slurry into the wellbore does not have to be interrupted to allow the cement slurry within the wellbore to hydrate form the initial cement placement until the interval being cemented in filled. Placement in a continuous operation saves a considerable amount of rig time, which significantly reduces the cost of the operation. Further, placement in a continuous operation eliminates discontinuities in the finished cement caused by the placement of slurry on hydrated cement, and contaminates that fall on the interface during hydration.

EXAMPLES

The ability of cement slurries containing relatively large particles to bridge and plug fractures was demonstrated by placement of three slurries in a three inch diameter cylinder having a slotted plate at the bottom, and then exposing tile slurry to a pressure of 100 pounds per square inch gauge at the top of the cylinder. The slots were of varying widths and two and one half inches long. About 1800 grams of slurry were placed in the cylinder in each test.

The three slurries used to demonstrate the present invention were prepared from high alumina cements having particle distributions, water content and slurry density described in TABLE 1 below.

TABLE 1

| Tyler Sieve Series Mesh | Opening inch | Size Distribution of Cement Solids (in weight percent retained by screen) | | |
|---|---|---|---|---|
| | | A | B | C |
| 4 | 0.187 | Trace | 0 | Trace |
| 6 | 0.132 | 6.3 | 0 | 4.0 |
| 8 | 0.0937 | 11.7 | 0 | 10. |
| 10 | 0.0661 | 21.0 | 1. | 22.7 |
| 14 | 0.0469 | 3.0 | — | 3.0 |
| 16 | 0.0394 | — | 2. | — |
| 20 | 0.0331 | 2.3 | — | 3.7 |
| 28 | 0.0234 | 1.7 | 9. | 9.0 |
| 48 | 0.0117 | 8.0 | 11.0 | 8.0 |
| 65 | 0.0083 | 5.0 | 6.0 | 6.0 |
| 100 | 0.0059 | 1.7 | 4.7 | 2.7 |
| 150 | 0.0041 | 1.3 | 5.7 | 2.0 |
| 200 | 0.0029 | 1.7 | 5.3 | 1.6 |
| <200 | <0.0029 | 36.3 | 55.3 | 43.3 |
| Water, wt % (based on dry solids) | | 7. | 10. | 7. |
| Slurry Density, gm/cc | | 2.73 | 2.57 | 2.72 |

Each slurry was prepared by adding to the solids described in TABLE 1 enough water to achieve the water content listed in TABLE 1.

The data in TABLE 1 includes the percent by weight of the solids passing through the next largest screen but retained on the screen of the Mesh listed in the first column. From TABLE 1 it can be seen that cement slurry B would bridge only a much smaller fracture than would slurries A or C because Slurry B has only a small percentage of particles of he larger sizes. Slurry B, however, does not comprise a sufficient amount of particles having a diameter greater than about 0.04 inch, so that it would not effectively bridge a fracture that had opened to a width greater than about 0.07 inches.

Cements A, B, and C of TABLE 1 are, respectively, A.P. Green's SP-7306-H, A.P. Green's 2-C-60, and A.P. Green's SP-7262-C.

TABLE 2 below summarizes results from a bridging test using the three slurries described in TABLE 1. TABLE 2 lists the amount of slurry that escaped though the slot prior to the slot bridging and the flow of slurry out of the slot stopping. For the slot bridging test described in TABLE 2, the slots were plugged with bee's wax so that the slurry would not run out or start to bridge prematurely. When pressure was applied, the bee's wax was quickly forced out of the slot for each test initiating the slurry flow.

TABLE 2

| Slurry | Slurry Loss through Slot in Grams | | | |
|---|---|---|---|---|
| | Slot size - inches | | | |
| | 0.125 | 0.1875 | 0.25 | 0.3125 |
| A | — | — | 15 | 75 |
| B | 670 | total | — | — |
| C | — | — | 15 | 95 |

From TABLE 2 it can be seen that with a sufficient amount of large particles, relatively large slots are bridged with small losses of slurry. Slurry B, not having a sufficient amount of large particles, was totally lost through the 3/16 inch wide slot, and a significant amount was lost through the ⅛ inch wide slot. It is also apparent from TABLE 2 that Slurry A, which has more large particles, bridged the 0.3125 inch wide slot with less loss of fluid than Slurry C. This set of experiments demonstrates the principle that reasonably sized particles will bridge initiating fractures, and that the remaining particles then form a seal sufficient to prevent propagation of the fracture.

The foregoing example is exemplary only, and reference to the following claims should be made to determine the scope of the present invention.

I claim:

1. A method to place cement in a wellbore in communication with a subterranean formation, the method comprising the steps of:
   placing into the wellbore a cement slurry comprising at least about 5 percent by weight, based on the total solids in the slurry, of solids having a diameter greater than about 0.04 inches, at least about 5 percent by weight, based on the total solids in the slurry, of solids having a diameter between about 0.004 and 0.04 inches, and at least about 10 percent by weight, based on the total solids in the slurry, of solids having a diameter of less than about 0.004 inches, wherein the slurry density is such that the static head of the wellbore contents would result in a pressure on the formation that would exceed the formation fracture initiation pressure; and
   allowing the slurry to hydrate.

2. The method of claim 1 wherein the cement slurry is placed into the wellbore by placement through a coiled tubing directly into an annulus between the formation and a tubular inside the wellbore.

3. The method of claim wherein the cement slurry is a high alumina cement slurry.

4. The method of claim 1 wherein the cement slurry is placed in the wellbore in a continuous operation.

5. The method of claim 1 wherein the slurry comprises at least two percent by weight, based on the total solids in the slurry, of solids having a diameter between about 0.004 inches and about 0.008 inches, at least two percent by weight, based on the total solids in the slurry, of solids having a diameter between about 0.008 and 0.016 inches, and at least two percent by weight, based on the total solids in the slurry, of solids having a diameter between 0.016 and 0.04 inches.

6. The method of claim 5 wherein the slurry comprises less than about 10 percent by weight, based on the total slurry, of water.

7. The method of claim 6 wherein the slurry is placed in the wellbore in a continuous operation.

* * * * *